(12) United States Patent
Minderer et al.

(10) Patent No.: US 11,928,854 B2
(45) Date of Patent: Mar. 12, 2024

(54) OPEN-VOCABULARY OBJECT DETECTION IN IMAGES

(71) Applicant: Google LLC, Mountain View, CA (US)

(72) Inventors: Matthias Johannes Lorenz Minderer, Zurich (CH); Alexey Alexeevich Gritsenko, Amsterdam (NL); Austin Charles Stone, San Francisco, CA (US); Dirk Weissenborn, Berlin (DE); Alexey Dosovitskiy, Berlin (DE); Neil Matthew Tinmouth Houlsby, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/144,045

(22) Filed: May 5, 2023

(65) Prior Publication Data

US 2023/0360365 A1     Nov. 9, 2023

Related U.S. Application Data

(60) Provisional application No. 63/339,165, filed on May 6, 2022.

(51) Int. Cl.
*G06K 9/00*       (2022.01)
*G06F 40/40*     (2020.01)
(Continued)

(52) U.S. Cl.
CPC ............ *G06V 10/764* (2022.01); *G06F 40/40* (2020.01); *G06V 10/225* (2022.01);
(Continued)

(58) Field of Classification Search
CPC .......... G06N 3/045; G06N 3/08; G06N 20/00; G06N 3/044; G06N 3/084; G06N 3/04;
(Continued)

(56) References Cited

U.S. PATENT DOCUMENTS

| 2019/0080225 A1* | 3/2019 | Agarwal | G06N 3/044 |
| 2020/0372610 A1* | 11/2020 | Lund | G06V 30/414 |
| 2023/0019211 A1* | 1/2023 | Wang | G06V 10/811 |

OTHER PUBLICATIONS

Ermolov, Hyperbolic Vision Transformers: Combining Improvements in Metric Learning, arXiv, Mar. 2022 (Year: 2022).*
(Continued)

*Primary Examiner* — Alex Kok S Liew
(74) *Attorney, Agent, or Firm* — Fish & Richardson P.C.

(57) ABSTRACT

Methods, systems, and apparatus, including computer programs encoded on a computer storage medium, for object detection. In one aspect, a method comprises: obtaining: (i) an image, and (ii) a set of one or more query embeddings, wherein each query embedding represents a respective category of object; processing the image and the set of query embeddings using an object detection neural network to generate object detection data for the image, comprising: processing the image using an image encoding subnetwork of the object detection neural network to generate a set of object embeddings; processing each object embedding using a localization subnetwork to generate localization data defining a corresponding region of the image; and processing: (i) the set of object embeddings, and (ii) the set of query embeddings, using a classification subnetwork to generate, for each object embedding, a respective classification score distribution over the set of query embeddings.

20 Claims, 5 Drawing Sheets

(51) Int. Cl.
 G06V 10/22 (2022.01)
 G06V 10/74 (2022.01)
 G06V 10/764 (2022.01)
 G06V 10/774 (2022.01)
 G06V 10/776 (2022.01)
 G06V 10/82 (2022.01)

(52) U.S. Cl.
 CPC .......... *G06V 10/761* (2022.01); *G06V 10/774* (2022.01); *G06V 10/776* (2022.01); *G06V 10/82* (2022.01)

(58) Field of Classification Search
 CPC .......... G06N 7/01; G06N 20/20; G06N 3/048; G06N 5/01; G06N 3/047; G06N 3/0464; G06N 3/088; G06N 3/09; G06N 3/006; G06N 3/063; G06N 5/04; G06N 3/042; G06N 3/0455; G06N 5/022; G06N 5/025; G06N 20/10; G06N 3/065; G06N 3/02; G06N 3/049; G06N 3/082; G06N 3/092; G06N 3/0442; G06N 5/045; G06N 3/126; G06N 3/008; G06N 3/0475; G06N 3/0495; G06N 3/0895; G06N 3/094; G06N 3/098; G06N 5/02
 See application file for complete search history.

(56) References Cited

OTHER PUBLICATIONS

Minderer, Simple Open-Vocabulary Object Detection with Vision Transformers, arXiv, May 6, 2022 (Year: 2022).*
Arnab et al., "ViViT: A Video Vision Transformer," Proceedings of the IEEE/CVF International Conference on Computer Vision, Oct. 2021, pp. 6836-6846.
Bansal et al., "Zero-Shot Object Detection," Proceedings of the European Conference on Computer Vision, Sep. 2018, pp. 384-400.
Bello et al., "Revisiting ResNets: Improved Training and Scaling Strategies," NeurIPS, 2021, 14 pages.
Biswas et al., "One shot detection with laplacian object and fast matrix cosine similarity," IEEE Transactions on Pattern Analysis and Machine Intelligence, 2016, 38(3):546-562.
Carion et al., "End-to-End Object Detection with Transformers," arXiv, May 28, 2020, 26 pages.
Chen et al., "Adaptive image transformer for one-shot object detection," Proceedings of the IEEE/CVF Conference on Computer Vision and Pattern Recognition, 2021, pp. 12242-12251.
Dehghani et al., "Scenic: A JAX Library for Computer Vision Research and Beyond," Proceedings of the IEEE/CVF Conference on Computer Vision and Pattern Recognition, Jun. 2022, pp. 21393-21398.
Fang et al., "You Only Look at One Sequence: Rethinking Transformer in Vision through Object Detection," NeurIPS, 2021, 15 pages.
Frome et al., "De ViSE: A Deep Visual-Semantic Embedding Modell," NeurIPS, 2013, 9 pages.
Ghiasi et al., "Simple Copy-Paste Is a Strong Data Augmentation Method for Instance Segmentation," Proceedings of the IEEE/CVF Conference on Computer Vision and Pattern Recognition, 2021, pp. 2918-2928.
github.com [online], "JAX: composable transformations of Python+NumPy programs," 2018, retrieved on May 5, 2023, retrieved from URL<http://github.com/google/jax>, 13 pages.
Gu et al., "Open-vocabulary object detection via vision and language knowledge distillation," arXiv, May 12, 2022, 21 pages.
Gupta et al., "LVIS: A Dataset for Large Vocabulary Instance Segmentation," Proceedings of the IEEE/CVF Conference on Computer Vision and Pattern Recognition (CVPR), Jun. 2019, pp. 5356-5364.
He et al., "Deep Residual Learning for Image Recognition," Proceedings of the IEEE Conference on Computer Vision and Pattern Recognition (CVPR), Jun. 2016, pp. 770-778.
He et al., "Mask R-CNN," Proceedings of the IEEE International Conference on Computer Vision (ICCV), Oct. 2017, pp. 2961-2969.
Hsieh et al., "One-Shot Object Detection with Co-Attention and Co-Excitation," NeurIPS, 2019, 10 pages.
Huang et al., "Deep Networks with Stochastic Depth," arXiv, Jul. 28, 2016, 16 pages.
Huang et al., "Pixel-BERT: Aligning image pixels with text by deep multi-modal transformers," arXiv, Jun. 22, 2020, 17 pages.
Jia et al., "Scaling up visual and vision-language representation learning with noisy text supervision," ICML, 2021, 139:4904-4916.
Kamath et al., "MDETR—modulated detection for end-to-end multi-modal understanding," ICCV, 2021, pp. 1780-1790.
Kolesnikov et al., "An Image is Worth 16×16 Words: Transformers for Image Recognition at Scale," arXiv, Jun. 3, 2021, 22 pages.
Kolesnikov et al., "Big transfer (BiT): General visual representation learning," ECCV, May 5, 2020, 28 pages.
Krishna et al., "Visual Genome: Connecting Language and Vision Using Crowdsourced Dense Image Annotations," International journal of computer vision, Feb. 6, 2017, 123(1):32-73.
Kuznetsova et al., "The Open Images Dataset V4," International Journal of Computer Vision, Mar. 2020, 128(7):1956-1981.
Lee et al., "Set transformer: A framework for attention-based permutation-invariant neural networks," Proceedings of the 36th International Conference on Machine Learning, 2019, 97:3744-3753.
Li et al., "Grounded language-image pre-training," Proceedings of the IEEE/CVF Conference on Computer Vision and Pattern Recognition, Jun. 2022, pp. 10965-10975.
Lin et al., "Microsoft COCO: Common objects in context," ECCV, 2014, pp. 740-755.
Liu et al., "SSD: Single shot multibox detector," ECCV, 2016, pp. 21-37.
Mahajan et al., "Exploring the limits of weakly supervised pretraining," Proceedings of the European Conference on Computer Vision (ECCV), Sep. 2018, pp. 185-201.
Michaelis et al., "One-shot instance segmentation," arXiv, May 28, 2019, 20 pages.
Osokin et al., "OS2D: One-stage one-shot object detection by matching anchor features," ECCV, Nov. 16, 2020, 17 pages.
Pham et al., "Combined scaling for zero-shot transfer learning," arXiv, Apr. 12, 2023, 47 pages.
Radford et al., "Learning transferable visual models from natural language supervision," Proceedings of the 38th International Conference on Machine Learning, Jul. 2021, 139:8748-8763.
Ren et al., "Faster R-CNN: Towards real-time object detection with region proposal networks," NeurIPS, 2015, 9 pages.
Shao et al., "Objects365: A Large-Scale, High-Quality Dataset for Object Detection," Proceedings of the IEEE/CVF International Conference on Computer Vision, Oct. 2019, pp. 8429-8438.
Socher et al., "Zero-Shot Learning Through Cross-Modal Transfer," NeurIPS, 2013, 10 pages.
Song et al., "ViDT: An efficient and effective fully transformer-based object detector," ICLR, 2022, 18 pages.
Steiner et al., "How to train your ViT? data, augmentation, and regularization in vision transformers," arXiv, Jun. 23, 2022, 16 pages.
Touvron et al., "Training data-efficient image transformers and distillation through attention," Proceedings of the 38th International Conference on Machine Learning, Jul. 2021, 139:10347-10357.
Xian et al., "Zero-shot learning—a comprehensive evaluation of the good, the bad and the ugly," IEEE Transactions on Pattern Analysis and Machine Intelligence, Jul. 19, 2018, 14 pages.
Yao et al., "Efficient detr: improving end-to-end object detector with dense prior," arXiv, Apr. 3, 2021, 10 pages.
Zareian et al., "Open-vocabulary object detection using captions," Proceedings of the IEEE/CVF Conference on Computer Vision and Pattern Recognition, Jun. 2021, pp. 14393-14402.
Zhai et al., "LiT: Zero-shot transfer with locked-image text tuning," Proceedings of the IEEE/CVF Conference on Computer Vision and Pattern Recognition (CVPR), Jun. 2022, pp. 18123-18133.

(56) References Cited

OTHER PUBLICATIONS

Zhai et al., "Scaling vision transformers," Proceedings of the IEEE/CVF Conference on Computer Vision and Pattern Recognition, Jun. 2022, pp. 12104-12113.

Zhong et al., "RegionCLIP: Region-based language-image pretraining," Proceedings of the IEEE/CVF Conference on Computer Vision and Pattern Recognition (CVPR), Jun. 2022, pp. 16793-16803.

Zhou et al., "Detecting Twenty-thousand Classes using Image-level Supervision," arXiv, Jul. 29, 2022, 27 pages.

Zhou et al., "Probabilistic two-stage detection," arXiv, Mar. 12, 2021, 13 pages.

Zhu et al., "Deformable DETR: Deformable transformers for end-to-end object detection," arXiv, Mar. 18, 2021, 16 pages.

International Search Report and Written Opinion in International Appln. No. PCT/US2023/021174, dated Aug. 1, 2023, 18 pages.

\* cited by examiner

OPEN-VOCABULARY OBJECT DETECTION IN IMAGES

CROSS REFERENCE TO RELATED APPLICATIONS

This application is a non-provisional of and claims priority to U.S. Provisional Patent Application No. 63/339,165, filed on May 6, 2022, the entire contents of which are hereby incorporated by reference.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that performs object detection in images.

Throughout this specification, an "embedding" can refer to an ordered collection of numerical values, e.g., a vector, matrix, or other tensor of numerical values.

According to one aspect, there is provided a method performed by one or more computers, the method comprising: obtaining: (i) an image, and (ii) a set of one or more query embeddings, wherein each query embedding represents a respective category of object; processing the image and the set of query embeddings using an object detection neural network to generate object detection data for the image, comprising: processing the image using an image encoding subnetwork of the object detection neural network to generate a set of object embeddings; processing each object embedding using a localization subnetwork of the object detection neural network to generate localization data defining a corresponding region of the image; and processing: (i) the set of object embeddings, and (ii) the set of query embeddings, using a classification subnetwork of the object detection neural network to generate, for each object embedding, a respective classification score distribution over the set of query embeddings, wherein the respective classification score distribution for each of the object embeddings defines, for each query embedding, a likelihood that the region of the image corresponding to the object embedding depicts an object that is included in the category represented by the query embedding.

In some implementations, for one or more of the query embeddings, obtaining the query embedding comprises: obtaining a text sequence that describes a category of object; and processing the text sequence using a text encoding subnetwork of the object detection neural network to generate the query embedding.

In some implementations, the image encoding subnetwork and the text encoding subnetwork are pre-trained, wherein the pre-training includes repeatedly performing operations comprising: obtaining: (i) a training image, (ii) a positive text sequence, wherein the positive text sequence characterizes the training image, and (iii) one or more negative text sequences, wherein the negative text sequences do not characterize the training image; generating an embedding of the training image using the image encoding subnetwork; generating respective embeddings of the positive text sequence and each of the negative text sequences using the text encoding subnetwork; and jointly training the image encoding subnetwork and the text encoding subnetwork to encourage: (i) greater similarity between the embedding of the training image and the embedding of the positive text sequence, (ii) lesser similarity between the embedding of the training image and the embeddings of the negative text sequences.

In some implementations, generating the embedding of the training image using the image encoding subnetwork comprises: processing the training image using the image encoding subnetwork to generate a set of object embeddings for the training image; and processing the object embeddings using an embedding neural network to generate the embedding of the training image.

In some implementations, the embedding neural network is jointly trained along with the image encoding subnetwork and the text encoding subnetwork.

In some implementations, jointly training the image encoding subnetwork and the text encoding subnetwork comprises: jointly training the image encoding subnetwork and the text encoding subnetwork to optimize an objective function that includes a contrastive loss term.

In some implementations, after the pre-training of the image encoding subnetwork and the text encoding subnetwork, the object detection neural network is trained to optimize an objective function that measures performance of the object detection neural network on a task of object detection in images.

In some implementations, the objective function that measures performance of the object detection neural network on the task of object detection in images comprises a bipartite matching loss term.

In some implementations, processing: (i) the set of object embeddings, and (ii) the set of query embeddings, using a classification subnetwork of the object detection neural network to generate, for each object embedding, a respective classification score distribution over the set of query embeddings, comprises: processing each object embedding using one or more neural network layers of the classification neural network to generate a corresponding classification embedding; and generating, for each object embedding, the classification score distribution over the set of query embeddings using: (i) the classification embedding corresponding to the object embedding, and (ii) the query embeddings, comprising: generating a respective measure of similarity between the classification embedding and each query embedding, wherein the measure of similarity between the classification embedding and a query embedding defines a likelihood that the region of the image corresponding to the object embedding depicts an object that is included in the category represented by the query embedding.

In some implementations, processing each object embedding using one or more neural network layers of the classification neural network to generate a corresponding classification embedding comprises: generating each classification embedding by projecting the corresponding object embedding into a latent space that includes the query embeddings.

In some implementations, generating the respective measure of similarity between the classification embedding and each query embedding comprises, for each query embedding: computing an inner product between the classification embedding and the query embedding.

In some implementations, for each object embedding, processing the object embedding using the localization subnetwork to generate localization data defining the corresponding region of the image comprises: processing the object embedding using the localization subnetwork to generate localization data defining a bounding box in the image.

In some implementations, processing the image using the image encoding subnetwork to generate the set of object embeddings comprises: generating a set of initial object embeddings by an embedding layer of the image encoding subnetwork, wherein each initial object embedding is derived at least in part from a corresponding patch in the image; and processing the set of initial object embeddings by a plurality of neural network layers, including one or more self-attention neural network layers, to generate a set of final object embeddings.

In some implementations, processing an object embedding using the localization subnetwork to generate localization data defining the corresponding region of the image comprises: generating a set of offset coordinates, wherein the offset coordinates define an offset of the corresponding region of the image from a location of the image patch corresponding to the object embedding.

In some implementations, the text encoding subnetwork comprises one or more self-attention neural network layers.

In some implementations, the method includes for one or more of the object embeddings: determining that the region of the image corresponding to the object embedding depicts an object that is included in the category represented by a query embedding based on the classification score distribution for the object embedding.

In implementations, for one or more of the query embeddings, obtaining the query embedding comprises: obtaining one or more query images, wherein each query image includes a respective target region that depicts an example of a target object; generating a respective embedding of the target object in each query image; and generating the query embedding by combining the embeddings of the target objects in the query images.

In some implementations, for each query image, generating the embedding of the target object in the query image comprises: processing the query image using the image encoding subnetwork to generate a set of object embeddings for the query image; processing each object embedding for the query image using the localization subnetwork to generate localization data defining a corresponding region of the query image; determining, for each object embedding for the query image, a respective measure of overlap between: (i) the target region of the query image that depicts the example of the target object, and (ii) the region of the query image corresponding to the object embedding for the query image; and selecting an object embedding from the set of object embeddings for the query image as the embedding of the target object in the query image based on the measures of overlap.

In some implementations, generating the query embedding by combining the embeddings of the target objects in the query images comprises: averaging the embeddings of the target objects in the query images.

According to another aspect, there is provided a system comprising: one or more computers; and one or more storage devices communicatively coupled to the one or more computers, wherein the one or more storage devices store instructions that, when executed by the one or more computers, cause the one or more computers to perform operations comprising: obtaining: (i) an image, and (ii) a set of one or more query embeddings, wherein each query embedding represents a respective category of object; processing the image and the set of query embeddings using an object detection neural network to generate object detection data for the image, comprising: processing the image using an image encoding subnetwork of the object detection neural network to generate a set of object embeddings; processing each object embedding using a localization subnetwork of the object detection neural network to generate localization data defining a corresponding region of the image; and processing: (i) the set of object embeddings, and (ii) the set of query embeddings, using a classification subnetwork of the object detection neural network to generate, for each object embedding, a respective classification score distribution over the set of query embeddings, wherein the respective classification score distribution for each of the object embeddings defines, for each query embedding, a likelihood that the region of the image corresponding to the object embedding depicts an object that is included in the category represented by the query embedding.

According to another aspect, there is provided one or more non-transitory computer storage media storing instructions that when executed by one or more computers cause the one or more computers to perform operations comprising: obtaining: (i) an image, and (ii) a set of one or more query embeddings, wherein each query embedding represents a respective category of object; processing the image and the set of query embeddings using an object detection neural network to generate object detection data for the image, comprising: processing the image using an image encoding subnetwork of the object detection neural network to generate a set of object embeddings; processing each object embedding using a localization subnetwork of the object detection neural network to generate localization data defining a corresponding region of the image; and processing: (i) the set of object embeddings, and (ii) the set of query embeddings, using a classification subnetwork of the object detection neural network to generate, for each object embedding, a respective classification score distribution over the set of query embeddings, wherein the respective classification score distribution for each of the object embeddings defines, for each query embedding, a likelihood that the region of the image corresponding to the object embedding depicts an object that is included in the category represented by the query embedding.

The subject matter described in this specification can be implemented in particular embodiments so as to realize one or more of the following advantages.

The system described in this specification can perform "open-vocabulary" object detection, i.e., the system can detect objects in any object category. In contrast, conventional object detection systems may be limited to detecting objects in a small, fixed set of object categories. The system enables open-vocabulary object detection by allowing object categories to be specified in the form of query embeddings. Each query embedding represents a respective object category and can be generated in any appropriate way, e.g., from a text sequence describing an object category (e.g., "a bird sitting on a tree"), or from an image showing an example of an object in an object category. In particular, the system enables image-conditional object detection, i.e., where a query embedding is derived from an image showing an example of an object, which allows the detection of objects that are difficult to describe through text yet easy to capture in an image (e.g., specialized technical parts).

In the case of text sequences, the system can perform object detection by comparing a set of query embeddings generated by processing text sequences using a text encoding neural network to a set of object embeddings generated by processing an image using an image encoding neural network. The text encoding neural network and the image encoding neural network can operate independently, which can enable a dramatic increase in inference efficiency. For example, in a system where the text encoding neural network and the image encoding neural network are fused, encoding a query would require a forward pass through the image encoding neural network and would need to be repeated for each image-query combination. In contrast, the system described in this specification can process an image once using the image encoding neural network, and thereafter generate arbitrarily many query embeddings without re-processing the image. The same also applies to other query modalities. The image encoding neural network and the query embedding generator are independent entities. The query embedding may be generated separately (and may also be generated on a different system) and provided to the system for performing object detection (and vice versa).

The system can "contrastively" pre-train the text encoding neural network and the image encoding neural network to learn a representation of images and text in a shared embedding space, e.g., such that embeddings of images and text that are semantically similar, that is, in terms of the object categories depicted in the image and defined in the text, tend to be closer in the embedding space. Training data for contrastive pre-training of the text encoding neural network and the image encoding neural network is abundantly available. Contrastively pre-training the text encoding neural network and the image encoding neural network can greatly increase the downstream performance of the text encoding neural network and the image encoding neural network on the task of object detection, for which significantly less training data may be available.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
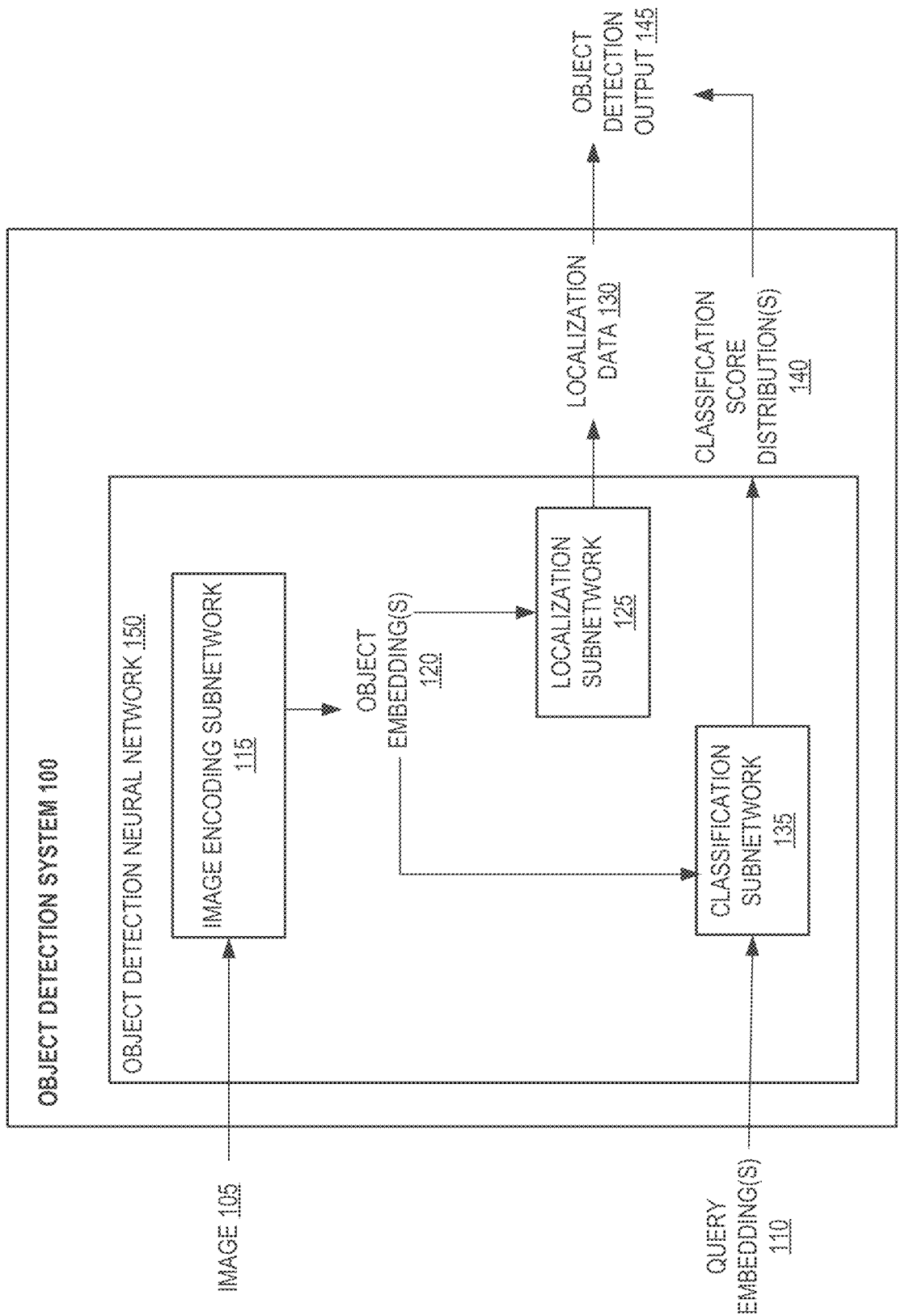
FIG. 1 is a block diagram of an example object detection system.

FIG. 1 shows an example object detection system 100. The object detection system 100 is an example of a system implemented as computer programs on one or more computers in one or more locations in which the systems, components, and techniques described below are implemented.

The object detection system 100 is configured to process an image 105 and a set of one or more query embeddings 110 to generate an object detection output 145.

The image 105 can be generated using any appropriate imaging device, e.g., a camera, a microscopic imaging device, a telescopic imaging device, a medical imaging device (e.g., a computed tomography (CT) imaging device, an x-ray imaging device, or an ultrasound (US) imaging device), etc. The image 105 can show (depict) one or more objects. For instance, an image captured by a camera can show objects such as road signs, vehicles, pedestrians, buildings, etc. As another example, an image captured by a medical imaging device can show anatomical structures (e.g., organs, tumors, etc.), tissues, regions of a human or animal body, etc. The image 105 may comprise pixel intensity values.

Each query embedding in the set of one or more query embeddings 110 represents a respective object category and can be generated in any appropriate way, e.g., from a text sequence describing an object category (e.g., "a bird sitting on a tree"), or from an image showing an example of an object in an object category. In particular, the object detection system 100 enables image-conditional object detection, i.e., where a query embedding is derived from an image showing an example of an object, which allows the detection of objects that are difficult to describe through text yet easy to capture in an image (e.g., specialized technical parts). Example techniques for generating query embeddings 110 representing object categories from, e.g., text sequences or images, are described in more detail below with reference to FIG. 2-4.

The object detection output can include one or more object detection instances. Each object detection instance can be associated with: (i) localization data identifying a region of the image, and (ii) object identification data characterizing a type of object shown in the region of the image. In some cases, the object identification data can include a classification score distribution that defines, for each query embedding, a likelihood that the region of the image shows an object in the object category represented by the query embedding. In some cases, the object identification data defines that the region of the image shows an object included in an object category associated with a particular query embedding from the set of query embeddings. The object detection output that can thus characterize the locations and types of objects shown in the image.

The object detection system 100 can receive the image 105 and the query embeddings 110, e.g., from a user or another source, through an application programming interface (API) made available by the system. The object detection system 100 can provide the object detection output 145, e.g., for transmission over a data communications network (e.g., the internet), or for display on an interface (e.g., a graphical user interface), or for storage in a memory.

The object detection system 100 can be implemented in any appropriate location, e.g., in a data center, or on a user device (e.g., a smartphone, tablet, or laptop), or in a distributed fashion, e.g., where certain portions of the system are implemented in a data center while other portions of the system are implemented on a user device.

The object detection system 100 can include an object detection neural network 150, that itself includes an image encoding subnetwork 115, a localization subnetwork 125, and a classification subnetwork 135, which are each described in more detail next and throughout this specification.

The image encoding subnetwork 115 processes the image 105 to generate a set of object embeddings 120. One or more of the object embeddings can each correspond to a respective object that is shown in the image.

The set of object embeddings 120 can include any appropriate number of object embeddings, e.g., a static (predefined) number of object embeddings, or a number of object embeddings that depends on the image 105. The image encoding subnetwork 115 can have any appropriate neural network architecture, e.g., including any appropriate types of neural network layers (e.g., attention layers, convolutional layers, fully-connected layers, etc.) in any appropriate number (e.g., 5 layers, 10 layers, or 20 layers) and connected in any appropriate configuration (e.g., as a directed graph of layers). A particular example architecture of the image encoding subnetwork 115 is described in more detail below with reference to FIG. 3.

The localization subnetwork 125 processes each object embedding in the set of object embeddings 120 to generate localization data 130 defining a corresponding region of the image. The localization subnetwork can have any appropriate neural network architecture, e.g., including any appropriate types of neural network layers (e.g., attention layers, convolutional layers, fully-connected layers, etc.) in any appropriate number (e.g., 5 layers, 10 layers, or 20 layers) and connected in any appropriate configuration (e.g., as a directed graph of layers).

In some examples, the localization data can define bounding boxes in the image that correspond to each object embedding. For example, if an image 105 depicts several different objects, the localization subnetwork 125 can define a corresponding bounding box for each object in the image.

The classification subnetwork 135 processes the set of object embeddings 120 and the set of query embeddings 110 to generate, for each object embedding, a respective classification score distribution 140 over the set of query embeddings. A classification score distribution 140 for an object embedding 120 defines, for each query embedding 110, a likelihood that the region of the image corresponding to the object embedding (i.e., according to the localization data) depicts an object that is included in the category represented by the query embedding.

The classification subnetwork 135 can have any appropriate neural network architecture, e.g., including any appropriate types of neural network layers (e.g., attention layers, convolutional layers, fully-connected layers, etc.) in any appropriate number (e.g., 5 layers, 10 layers, or 20 layers) and connected in any appropriate configuration (e.g., as a directed graph of layers). A particular example architecture of the classification subnetwork is described in more detail below with reference to FIG. 3

The object detection system 100 can process the localization data 130 and the classification score distributions 140 to generate the object detection output 145. The object detection output includes one or more object detection instances, where each object detection instance can be associated with: (i) localization data identifying a region of the image, and (ii) object identification data characterizing a type of object shown in the region of the image (as described above).

In particular, the object detection system 100 can generate a respective object detection instance for each of one or more of the object embeddings. For instance, for each of one or more object embeddings, the object detection system 100 can generate an object detection instance associated with: (i) the localization data generated by the localization subnetwork for the object embedding, and (ii) object identification data based on the classification score distribution generated by the classification subnetwork for the object embedding. In some cases, the object identification data includes the classification score distribution. In some cases, the object identification data identifies the query embedding associated with the highest score under the classification score distribution.

In some instances, the object detection system 100 can refrain from generating an object detection instance for an object embedding, e.g., based on the classification score distribution for the object embedding. For instance, the object detection system 100 can refrain from generating an object detection instance for an object embedding if the maximum score included in the classification score distribution for the object embedding is below a threshold, e.g., a threshold of 0.001, or 0.01, or 0.1.

Training the object detection neural network will be described in more detail below with reference to FIG. 4-5

Figure 2:
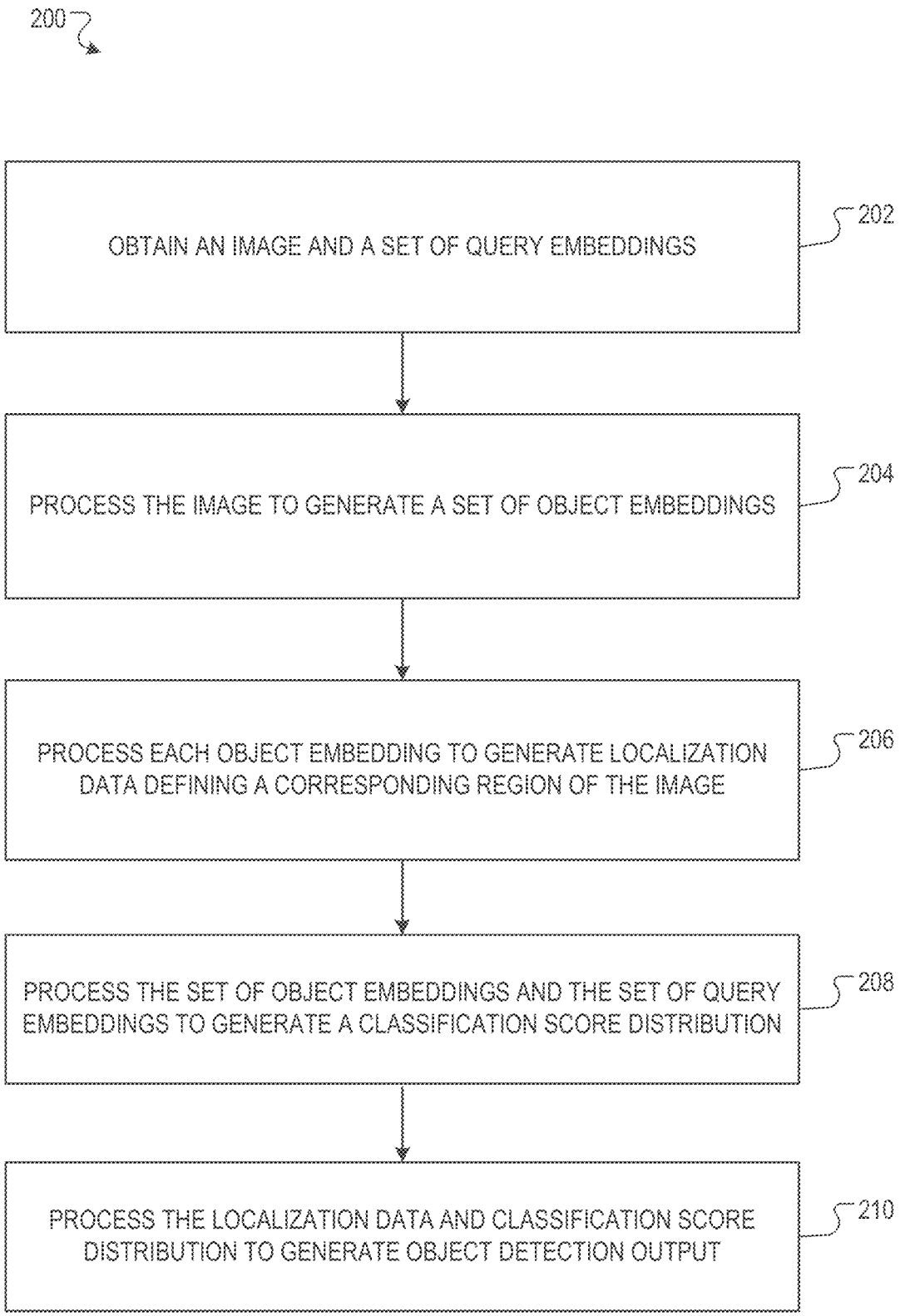
FIG. 2 is a flow diagram of an example process for performing object detection and localization.

FIG. 2 is a flow diagram of an example process 200 for performing object detection and localization. For convenience, the process 200 will be described as being performed by a system of one or more computers located in one or more locations. For example, an object detection system, e.g., the object detection system 100 of FIG. 1, appropriately programmed in accordance with this specification, can perform the process 200.

The system obtains an image and a set of query embeddings (step 202). Each query embedding represents a respective category of object.

The image can depict one or more objects. For instance, an image captured by a camera can show objects such as road signs, vehicles, pedestrians, buildings, etc. As another example, an image captured by a medical imaging device can show anatomical structures (e.g., organs, tumors, etc.), tissues, regions of a human or animal body, etc.

The system can obtain the query embeddings in any of a variety of possible ways. A few example techniques by which the system can generate query embeddings are described next.

In some examples, the system generates one or more of the query embeddings by obtaining a text sequence that describes a category of object. The system then processes the text sequence using a text encoding subnetwork to generate a query embedding for the given text sequence. For example, the given text sequence can be a short description of a type of object e.g., "monarch butterfly" or "full moon".

In some examples, the system obtains one or more of the query embeddings by first obtaining one or more query images. Each query image includes a target region that shows an example of a target object. For example, a query image can depict a bird on a tree branch in front of a blue background. If the target object is the bird, the target region can be the region depicting the bird. The system generates a respective embedding of the target object in each query image and generates a query embedding by combining the embeddings of the target object in the query images. In some examples, the system generates the query embedding by averaging the embeddings of the target objects in the query images to combine the embeddings of the target objects in the query images.

The system can generate embeddings of the target object for each query image by processing the query image using an image encoding subnetwork to generate a set of object embeddings for the query image. The system can process each object embedding for the query image using a localization subnetwork to generate localization data defining a corresponding region of the query image. The system can determine, for each object embedding for the query image, a respective measure of overlap e.g., using an intersection over union (IoU) measure between the target region of the query image that depicts the example of the target object and the region of the query image corresponding to the object embedding for the query image. The system can select an object embedding from the set of object embeddings for the query image as the embedding of the target object in the query image based on the measures of overlap. For example, the system can select the object embedding with the highest measure of overlap.

For example, the query image can depict a tennis ball and a racket. The target region can depict the tennis ball. The set of object embeddings can include an object embedding corresponding to the tennis ball and an object embedding corresponding to the racket. The system can determine two measures of overlap, one between the object embedding corresponding to the tennis ball and the target region depicting the tennis ball, and the other between the object embedding corresponding to the racket and the target region depicting the tennis ball. The system can determine that there is a higher measure of overlap between the object embedding corresponding to the tennis ball and the target region depicting the tennis ball and select this object embedding as the embedding of the target object. The measure of overlap could be a percentage or a score on a predetermined scale, or an intersection over union (IoU) measure.

The image encoding subnetwork, text encoding subnetwork, and localization subnetwork can have any appropriate neural network architecture, e.g., including any appropriate types of neural network layers (e.g., self-attention layers, convolutional layers, fully-connected layers, etc.) in any appropriate number (e.g., 5 layers, 10 layers, or 20 layers) and connected in any appropriate configuration (e.g., as a directed graph of layers).

Training the image encoding subnetwork, text encoding subnetwork, and localization subnetwork will be described in more detail below with reference to FIG. 4-5

The system processes the image using an image encoding subnetwork to generate a set of object embeddings (step 204). For example, the system can generate a set of initial object embeddings by an embedding layer of the image encoding subnetwork. In particular, the system can divide the image into a grid of patches. Each initial object embedding can be derived from a corresponding patch in the image, e.g., each initial object embedding can be generated by concatenating the pixels in a corresponding patch in the image into a vector. The system can process the set of initial object embeddings by one or more neural network layers, e.g., including one or more self-attention neural network layers, to generate a set of final object embeddings. The final set of object embeddings can include one or more embeddings for each of one or more objects depicted in the image.

In some implementations, the system can generate a predefined number e.g., 500 object embeddings for each input image. The image can contain less objects than the predefined number of object embeddings. For example, an image can only include 2 objects. In this case, the system may generate 2 object embeddings that correspond to objects in the input image and 498 object embeddings that do not correspond to any object in the input image, for example, these may correspond to embeddings generated from the image background. Alternatively, there may be multiple object embeddings generated per object, in particular, where an object embedding is derived from image patches, an object may span multiple patches. The object embeddings may be thought of as image region embeddings in the case where the object embeddings are derived from image patches.

The system processes each object embedding to generate localization data defining a corresponding region of the image using a localization subnetwork (step 206).

The system can use a localization subnetwork to process each object embedding to generate localization data defining a region of the image, e.g., a bounding box in the image. For example, if an image depicts several different objects, the localization data can define a corresponding bounding box for each object in the image.

In some examples, the system can generate a set of offset coordinates as localization data. The offset coordinates can be represented as (x,y) displacements. The offset coordinates can define an offset of the corresponding region of the image from an image patch corresponding to the object embedding.

The system processes the set of object embeddings and the set of query embeddings using a classification subnetwork to generate a classification score distribution over the set of query embeddings for each object embedding (step 208). A classification score distribution for an object embedding defines, for each query embedding, a likelihood that the region of the image corresponding to the object embedding (i.e., according to the localization data) depicts an object that is included in the category represented by the query embedding.

The system can generate a set of classification score distributions by first processing each object embedding using one or more neural network layers of the classification neural network to generate a corresponding classification embedding. The system can then generate, for each object embedding, the classification score distribution over the set of query embeddings using the classification embedding corresponding to the object embedding and the query embeddings.

In some examples, the system generates each classification embedding by projecting the corresponding object embedding into a latent space that includes the query embeddings.

In some examples, the system determines a respective measure of similarity (e.g., $L_1$ norm, $L_2$ norm, cosine similarity, inner product, etc.) between the classification embedding and each query embedding. The measure of similarity between the classification embedding and a query embedding can define a likelihood that the region of the image corresponding to the object embedding depicts an object that is included in the category represented by the query embedding.

The system generates an object detection output from the localization data and the classification score distributions (step 210). The object detection output includes one or more object detection instances, where each object detection instance can be associated with: (i) localization data identifying a region of the image, and (ii) object identification data characterizing a type of object shown in the region of the image. In particular, the system can generate a respective object detection instance for each of one or more of the object embeddings. For instance, for each of one or more object embeddings, the system can generate an object detection instance associated with: (i) the localization data generated by the localization subnetwork for the object embedding, and (ii) object identification data based on the classification score distribution generated by the classification subnetwork for the object embedding. In some cases, the object identification data includes the classification score distribution. In some cases, the object identification data identifies the query embedding associated with the highest score under the classification score distribution.

In some instances, the system can refrain from generating an object detection instance for an object embedding, e.g., based on the classification score distribution for the object embedding. For instance, the system can refrain from generating an object detection instance for an object embedding if the maximum score included in the classification score distribution for the object embedding is below a threshold, e.g., a threshold of 0.001, or 0.01, or 0.1.

For example, the system can receive a query embedding representing the category 'duck' and a query embedding representing the category 'dog'. The system can receive an input image depicting a duck and a cat. The set of object embeddings for the image include an embedding representing the duck and an embedding representing the cat. For the object embedding representing the duck, the classification score distribution can include a score of 0.93 for the category 'duck' and a score of 0.01 for the category 'dog'. For the object embedding representing the cat, the classification score distribution can include a score of 0.02 for the category 'duck' and a score of 0.01 for the category 'dog'. The system can determine that it will not generate an object detection instance if the maximum score included in the classification score distribution for an object embedding is below a threshold of 0.1. Thus, the system will not generate an object detection instance for the object embedding representing the cat, but the system will generate an object detection instance for the object embedding representing the duck.

In some cases, the set of query embeddings includes a query embedding designated as being a "background" query embedding. The background query embedding can represent a background portions of an image, e.g., portions of an image that do not show particular objects. In response to determining that the background embedding is associated with the maximum score under a classification score distribution for an object embedding, the system can refrain from generating an object detection instance for the object embedding.

The object detection output will include one object detection instance associated with localization data identifying a region of the image that depicts the duck and object identification data characterizing the duck. For example, the localization data can be a bounded box that surrounds the region of the image that depicts the duck. The object identification data can identify that, for the object embedding representing the duck, the query embedding representing the category 'duck' is associated with the highest score under the classification score distribution over the query embeddings.

In some examples, the system can be implemented on a robot. The robot can receive natural language instructions to perform tasks. The natural language instructions can require the robot to identify certain objects (e.g., "clean the kitchen using the X"). The software onboard the robot can use the open-vocabulary object detection capability of the object detection neural network to identify objects specified by the natural language instructions.

In some examples the system can be implemented on a robot that has seen one or more objects before. The robot can receive instructions to identify similar objects to the objects it has seen before. The object detection neural network can use the objects it has seen before to generate the set of query embeddings. The robot can use the object detection neural network to detect similar objects in the future.

Figure 3:
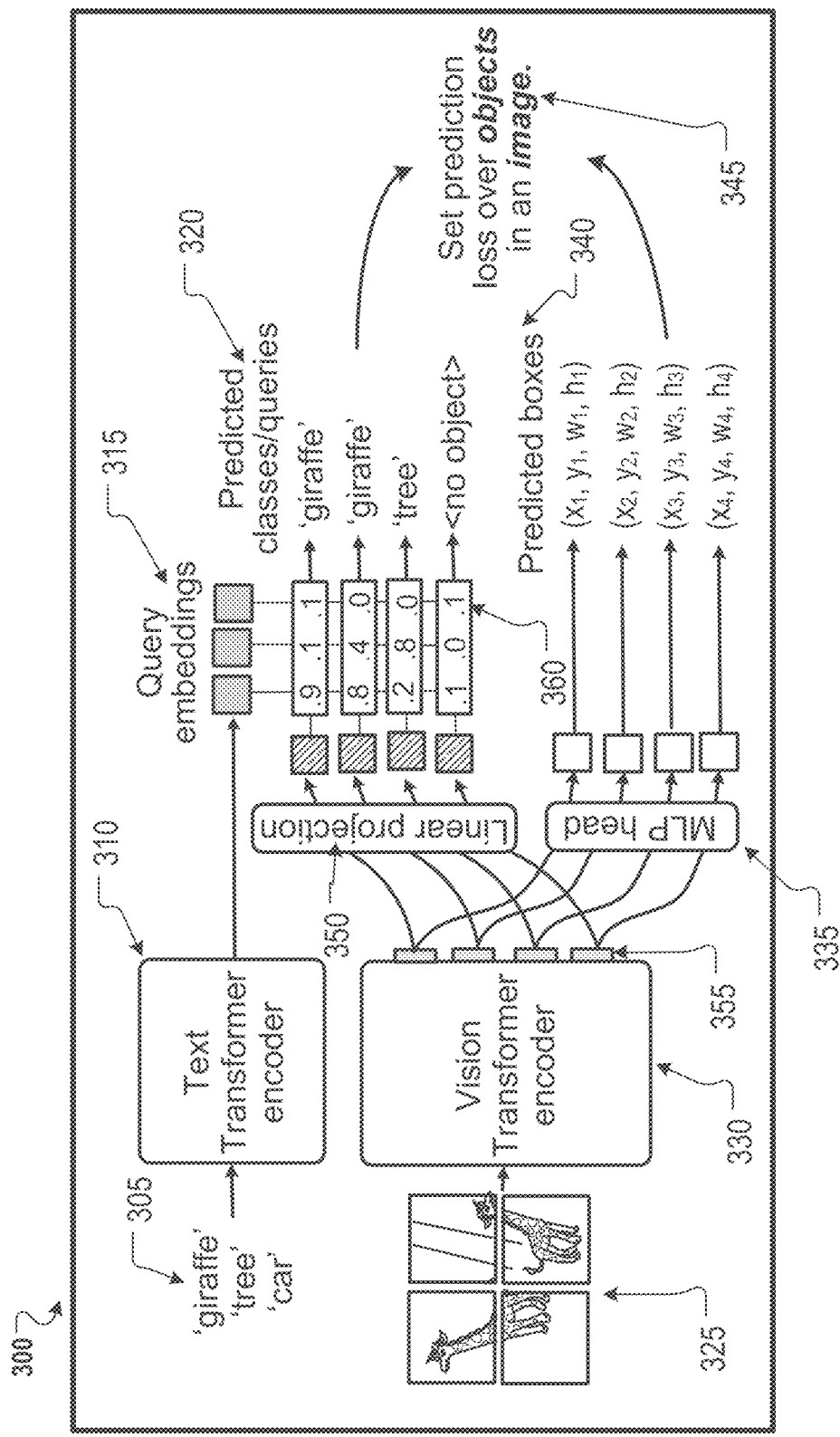
FIG. 3. is an example architecture of the object detection system of FIG. 1.

FIG. 3. shows an example architecture 300 of the object detection system of FIG. 1. The architecture shows a text encoding neural network 310 and an image encoding neural network 330.

The image encoding subnetwork and text encoding subnetwork can have any appropriate neural network architecture, e.g., including any appropriate types of neural network layers (e.g., self-attention layers, convolutional layers, fully-connected layers, etc.) in any appropriate number (e.g., 5 layers, 10 layers, or 20 layers) and connected in any appropriate configuration (e.g., as a directed graph of layers). Example architectures include a Vision Transformer encoder.

A text encoding subnetwork 310 receives text sequences 305 that describe a category of object e.g., 'giraffe', 'tree', 'car'. The text sequences 305 can be names of categories or other textual descriptions. The text encoding subnetwork processes the text sequences 305 to generate a set of query embeddings 315 corresponding to the text sequences. Each query embedding consists of a separate token sequence which represents an individual object description and is individually processed by the text encoder.

The image encoding neural network 330 receives an input image 325 that is divided into patches. The image encoding neural network 330 generates a set of object embeddings 355. The set of object embeddings includes a per-object embedding for each object shown in the input image 325. The input image 325 shows two giraffes and one tree. In this example, there can be an object embedding for each giraffe and the tree.

A localization subnetwork 335 processes the object embeddings 355 to generate localization data defining a set of bounding boxes 340 in the image. The bounding boxes are represented as box coordinates. For each object embedding, the localization subnetwork generates a predicted box that represents the location of the object.

A classification subnetwork 350 processes the set of object embeddings and the set of query embeddings to generate a classification score distribution 360 for each object embedding over the set of query embeddings. This can generate a predicted class 320 for each object embedding.

The query embeddings 315 from left to right are 'giraffe', 'tree', and 'car'. The classification score distribution corresponding to the topmost object embedding shows a likelihood of 0.9 for giraffe, 0.1 for tree, and 0.1 for car and thus the classification subnetwork 350 predicts that the object embedding belongs to the class 'giraffe'. The classification score distribution corresponding to the bottommost object embedding shows a likelihood of 0.1 for giraffe, 0 for tree, and 0.1 for car and thus the classification subnetwork 350 predicts that the object embedding does not belong to one of the query classes.

The architecture 300 includes no fusion between image encoders 330 and text encoders 310. That is, the image encoding neural network 330 and the text encoding neural network 310 are separate neural networks that perform their processing independent of each other. Although early fusion seems intuitively beneficial, it reduces inference efficiency because encoding a query 315 requires a forward pass through the entire image model and needs to be repeated for each image/query combination. In this architecture, the system 100 can compute query embeddings independently of the image, allowing the use of thousands of queries per image, many more than is possible with early fusion.

The object detection system 100 processes the predicted classes 320 and the predicted boxes 340 to generate a respective object detection instance for each of one or more of the object embeddings. An object detection instance can define, e.g., a bounding box and a classification score distribution for the bounding box.

Figure 4:
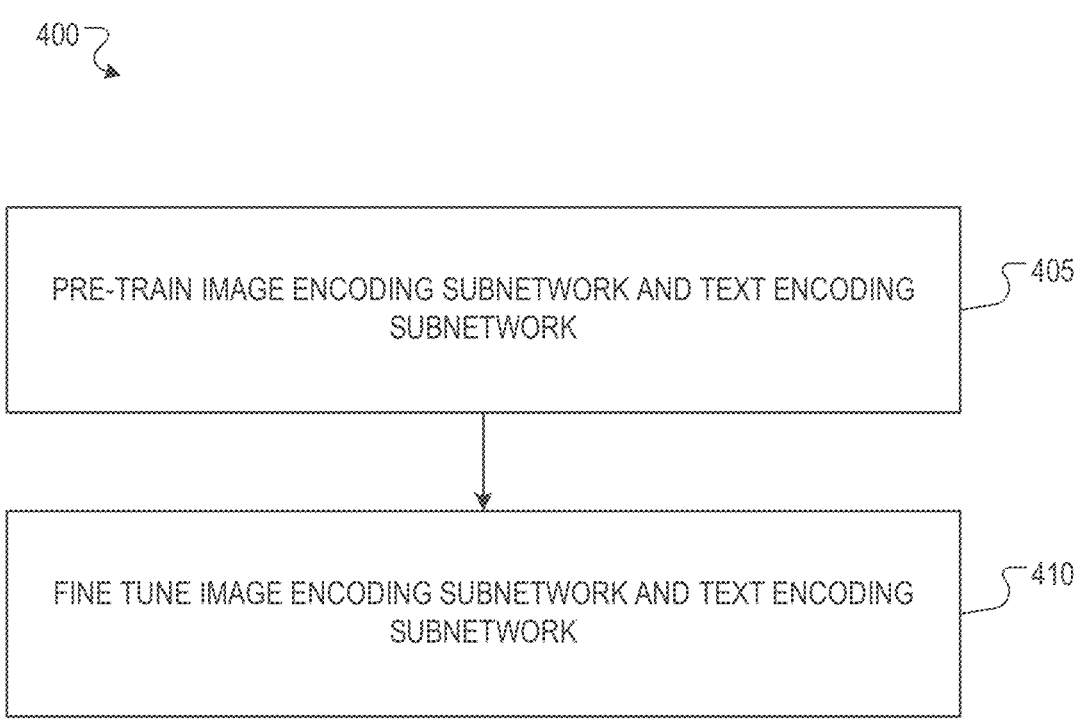
FIG. 4 is a flow diagram of an example process for pre-training and fine-tuning an image encoding subnetwork and a text encoding subnetwork

FIG. 4 is a flow diagram of an example process 400 for pre-training and fine-tuning an image encoding subnetwork and a text encoding subnetwork, e.g., that are included in an object detection neural network as described with reference to FIG. 1. For convenience, the process 400 will be described as being performed by a system of one or more computers located in one or more locations, e.g., the object detection system described with reference to FIG. 1.

The system pre-trains an image encoding subnetwork and a text encoding subnetwork (step 405). The pre-training includes repeatedly performing a sequence of operations for a set of training images. For instance, for each training image in a set of training images, the system can obtain a positive text sequence and one or more negative text sequences. The positive text sequence characterizes at least one of the objects depicted in the training image and the negative text sequences do not characterize any of the objects depicted in the training image. For example, the training image can be a monarch butterfly. The positive text sequence can be "monarch butterfly" and the negative text sequences can be "swallowtail butterfly", "moth", "caterpillar" and "starfish". The system can obtain the positive text sequence and the negative text sequences for a training image from a variety of possible sources. For instance, the system can scrape positive text sequences for training images as the captions of images from a database of images. The negative text sequences can be, e.g., randomly sampled text sequences.

The system can generate an embedding of a training image using the image encoding subnetwork. For example, the system can use the image encoding subnetwork to process the training image to generate a set of object embeddings for the training image (as described, e.g., with reference to FIG. 1 and FIG. 2). The system can then process the object embeddings using an embedding neural network to generate the embedding of the training image. The embedding neural network can have any appropriate neural network architecture, e.g., including any appropriate types of neural network layers (e.g., pooling layers, fully connected layers, attention layers, etc.) in any appropriate number (e.g., 1 layer, 5 layers, or 10 layers) and connected in any appropriate configuration (e.g., as a directed graph of layers). A particular example architecture of an embedding neural network is described with reference to FIG. 5. In some implementations, the embedding neural network is jointly trained along with the image encoding subnetwork and the text encoding subnetwork, as will be described in more detail below.

The system generates respective embeddings of the positive text sequence and each of the negative text sequences using the text encoding subnetwork. That is, for the positive text sequence and each of the negative text sequences, the system processes the text sequence using the text encoding subnetwork to generate an embedding of the text sequence.

The system jointly trains the image encoding subnetwork, the text encoding subnetwork, and optionally, the embedding neural network, to encourage: (i) greater similarity between the embedding of the training image and the embedding of the positive text sequence, and (ii) lesser similarity between the embedding of the training image and the embeddings of the negative text sequences. For instance, the system can jointly train the image encoding subnetwork, the text encoding subnetwork, and the embedding neural network to optimize an objective function that includes a contrastive loss term or a triplet loss term. The objective function can measure similarity between embeddings, e.g., using an inner product, or an $L_1$ similarity measure, or an $L_2$ similarity measure, or any other appropriate similarity measure. For each training image, the system can determine gradients of the objective function with respect to the parameters of the image encoding subnetwork, the text encoding subnetwork, and optionally, the embedding neural network. The system can then adjust the parameter values of the image encoding subnetwork, the text encoding subnetwork, and optionally, the embedding neural network, using the gradients, e.g., using the update rule of an appropriate gradient descent optimization algorithm, e.g., RMSprop or Adam.

That is, the system can "contrastively" pre-train the text encoding neural network and the image encoding neural network to learn a representation of images and text in a shared embedding space, e.g., such that embeddings of images and text that have objects in common tend to be closer in the embedding space. Contrastively pre-training the text encoding neural network and the image encoding neural network can greatly increase the downstream performance of the text encoding neural network and the image encoding neural network on the task of object detection.

In some examples, the embedding neural network is discarded after pre-training is complete.

After pre-training the image encoding subnetwork and the text encoding subnetwork, the system then fine-tunes the image encoding subnetwork and the text encoding subnetwork on the task of object detection (step 410). The system fine-tunes both the image encoding subnetwork and the text-encoding subnetwork from end-to-end.

When fine-tuning, the system repeatedly performs a sequence of operations for a set of training examples. For instance, each training example can include: a training image, one or more positive text sequences, a respective bounding box associated with each positive text sequence, and one or more negative text sequences. Each positive text sequence can characterize a respective object that is shown in the corresponding bounding box in the training image. The negative text sequences do not characterize objects shown in the training image.

The system can use the image encoding subnetwork to process the training image to generate a set of object embeddings for the training image (as described, e.g., with reference to FIG. 1 and FIG. 2).

The system generates respective embeddings of the positive text sequence and each of the negative text sequences using the text encoding subnetwork. That is, for the positive text sequence and each of the negative text sequences, the system processes the text sequence using the text encoding subnetwork to generate an embedding of the text sequence.

The system uses a localization subnetwork to generate localization data defining a set of bounding boxes in the image. For each object embedding, the localization subnetwork generates a predicted box that represents the location of the object.

The system trains the object detection neural network to optimize an objective function that measures the performance of the object detection neural network on the task of object detection in images. In some examples, the objective function includes a loss term that encourages the object detection neural network to generate accurate object classifications, e.g., the objective function can include a bipartite matching loss term. In some examples, the objective function includes a loss term a loss term that encourages the localization subnetwork to perform accurate localization. For instance, the objective function can include a loss term that measures, for each positive text sequence in the training example, an error between: (i) a bounding box associated with the positive text sequence in the training example, and (ii) a bounding box generated by the object detection neural network for a corresponding object embedding.

Figure 5:
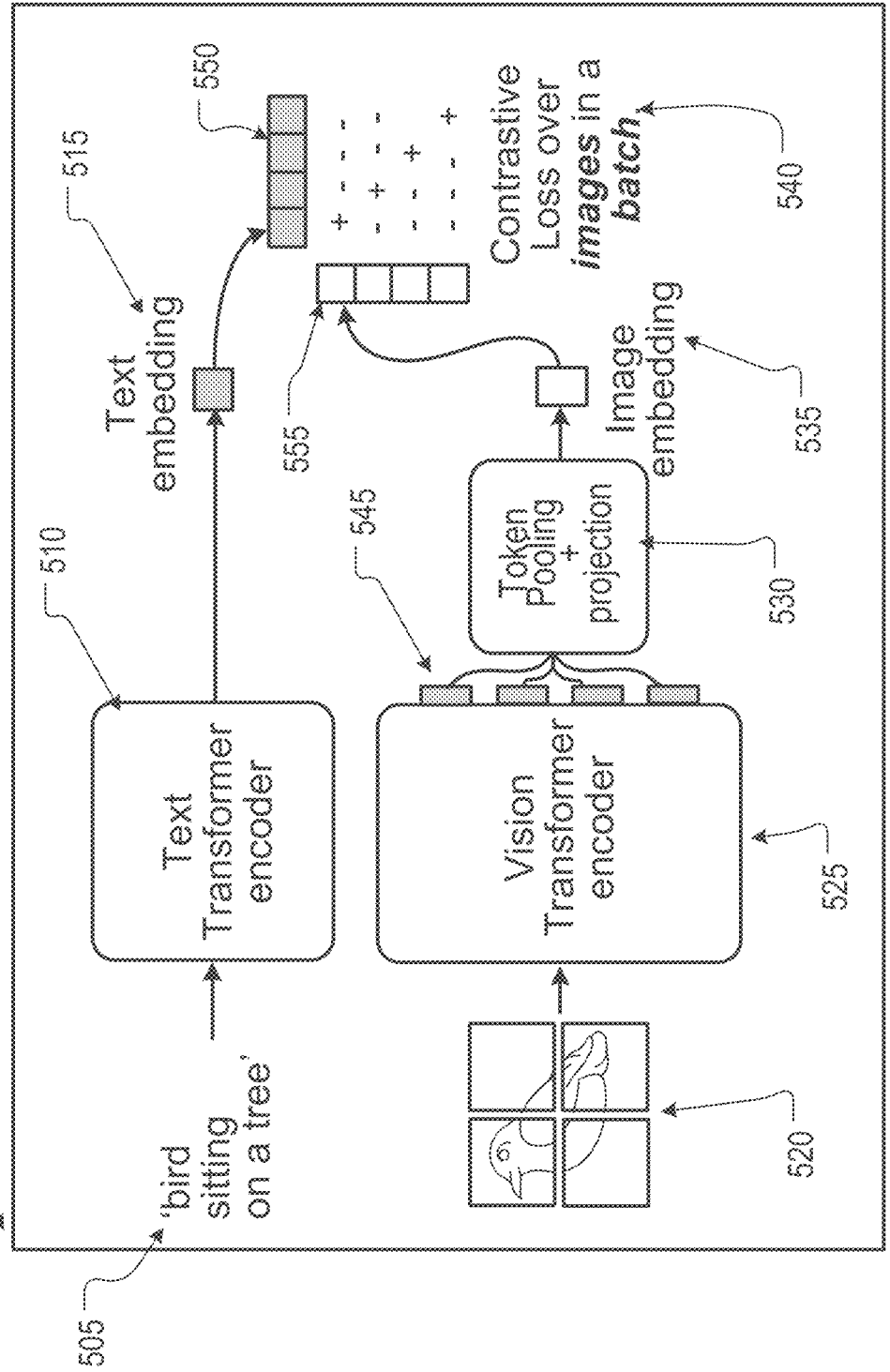
FIG. 5 illustrates the pre-training of an image encoding subnetwork and a text encoding subnetwork Like reference numbers and designations in the various drawings indicate like elements.

FIG. 5 illustrates the pre-training of an image encoding subnetwork 525 and a text encoding subnetwork 510, e.g., that are included in the object detection neural network described with reference to FIG. 1.

The text encoding subnetwork 525 receives a positive text sequence 505 e.g., 'bird sitting on a tree'. The image encoding subnetwork receives a training image 520 that matches the positive text sequence e.g., an image of a bird sitting on a tree.

The text encoding subnetwork 510 processes the positive text sequence 505 to generate a text embedding 515 corresponding to the positive text sequence. The image encoding subnetwork 525 processes the input image 520 to generate an embedding of the training image 535.

The input image 520 can be divided into patches. The image encoding subnetwork 525 generates a set of object embeddings 545.

An embedding neural network 530 processes the object embeddings 545 to generate the embedding of the training image 535. In this example, the embedding neural network includes a pooling layer (e.g., an average pooling layer or a max-pooling layer) and a projection (e.g., fully-connected) layer.

The object detection system can train the text encoding subnetwork and the image encoding subnetwork one batch at a time. A batch can include one or more training images along with respective positive and negative text sequences. For example, a batch can include five training images with one image depicting a bird, one image depicting a cat, one image depicting a dog, one image depicting a squirrel, and one image depicting a giraffe along with appropriate descriptions. For the bird image, a positive text sequence can be 'bird sitting on a tree' and a negative sequence can be 'giraffe standing on grass'.

The text embedding 515 is added to a set of text embeddings 550 corresponding to other text descriptions in the batch. The embedding of the training image 535 is added to a set of image embeddings corresponding to other training images in the batch.

The object detection system 100 optimizes an objective function that includes a contrastive loss term over all images in a batch 540. The objective function encourages greater similarity between the embedding of the training image 535 and the embedding of the positive text sequence 515 and lesser similarity between the embedding of the training image and the embeddings of the negative text sequences. The illustration in FIG. 5 shows a grid that has text embeddings 550 on one axis and embeddings of training images 555 on the other axis. The intersection of each text embedding and each image embedding is denoted with either a '+' or a '−', where '+' indicates that a text embedding and image embedding are encouraged to be similar and '−' indicates that the text embedding and the image embedding are encouraged to be dissimilar.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
obtaining: (i) an image, and (ii) a set of one or more query embeddings, wherein each query embedding represents a respective category of object;
processing the image and the set of query embeddings using an object detection neural network to generate object detection data for the image, comprising:
processing the image using an image encoding subnetwork of the object detection neural network to generate a set of object embeddings, wherein the image encoding subnetwork comprises one or more self-attention neural network layers;
processing each object embedding using a localization subnetwork of the object detection neural network to generate localization data defining a corresponding region of the image; and
processing: (i) the set of object embeddings, and (ii) the set of query embeddings, using a classification subnetwork of the object detection neural network to generate, for each object embedding, a respective classification score distribution over the set of query embeddings,
wherein the respective classification score distribution for each of the object embeddings defines, for each query embedding, a likelihood that the region of the image corresponding to the object embedding depicts an object that is included in the category represented by the query embedding.

2. The method of claim 1, wherein for one or more of the query embeddings, obtaining the query embedding comprises:
obtaining a text sequence that describes a category of object; and
processing the text sequence using a text encoding subnetwork of the object detection neural network to generate the query embedding;
wherein the image encoding subnetwork and the text encoding subnetwork are pre-trained, wherein the pre-training includes repeatedly performing operations comprising:
obtaining: (i) a training image, (ii) a positive text sequence, wherein the positive text sequence characterizes the training image, and (iii) one or more negative text sequences, wherein the negative text sequences do not characterize the training image;
generating an embedding of the training image using the image encodin subnetwork, comprising:
processing the training image using the image encoding subnetwork to generate a set of object embeddings for the training image; and
processing the object embeddings using an embedding neural network to generate the embedding of the training image;
generating respective embeddings of the positive text sequence and each of the negative text sequences using the text encoding subnetwork; and
jointly training the image encoding subnetwork and the text encoding subnetwork to encourage: (i) greater similarity between the embedding of the training image and the embedding of the positive text sequence, (ii) lesser similarity between the embedding of the training image and the embeddings of the negative text sequences, comprising:
jointly training the image encoding subnetwork and the text encoding subnetwork to optimize an objective function that includes a contrastive loss term.

3. The method of claim 2, wherein the embedding neural network is jointly trained along with the image encoding subnetwork and the text encoding subnetwork.

4. The method of claim 2, wherein after the pre-training of the image encoding subnetwork and the text encoding subnetwork, the object detection neural network is trained to optimize an objective function that measures performance of the object detection neural network on a task of object detection in images.

5. The method of claim 4, wherein the objective function that measures performance of the object detection neural network on the task of object detection in images comprises a bipartite matching loss term.

6. The method of claim 2, wherein processing: (i) the set of object embeddings, and (ii) the set of query embeddings, using a classification subnetwork of the object detection neural network to generate, for each object embedding, a respective classification score distribution over the set of query embeddings, comprises:
processing each object embedding using one or more neural network layers of the classification neural network to generate a corresponding classification embedding; and
generating, for each object embedding, the classification score distribution over the set of query embeddings using: (i) the classification embedding corresponding to the object embedding, and (ii) the query embeddings, comprising:
generating a respective measure of similarity between the classification embedding and each query embedding, wherein the measure of similarity between the classification embedding and a query embedding defines a likelihood that the region of the image corresponding to the object embedding depicts an object that is included in the category represented by the query embedding.

7. The method of claim 6, wherein processing each object embedding using one or more neural network layers of the classification neural network to generate a corresponding classification embedding comprises:
generating each classification embedding by projecting the corresponding object embedding into a latent space that includes the query embeddings.

8. The method of claim 6, wherein generating the respective measure of similarity between the classification embedding and each query embedding comprises, for each query embedding:
computing an inner product between the classification embedding and the query embedding.

9. The method of claim 2, wherein for each object embedding, processing the object embedding using the localization subnetwork to generate localization data defining the corresponding region of the image comprises:
processing the object embedding using the localization subnetwork to generate localization data defining a bounding box in the image.

10. The method of claim 1, wherein processing the image using the image encoding subnetwork to generate the set of object embeddings comprises:
generating a set of initial object embeddings by an embedding layer of the image encoding subnetwork, wherein each initial object embedding is derived at least in part from a corresponding patch in the image; and processing the set of initial object embeddings by a plurality of neural network layers, including the one or more self-attention neural network layers of the image encoding subnetwork, to generate a set of final object embeddings.

11. The method of claim 10, wherein processing an object embedding using the localization subnetwork to generate localization data defining the corresponding region of the image comprises:

generating a set of offset coordinates, wherein the offset coordinates define an offset of the corresponding region of the image from a location of the image patch corresponding to the object embedding.

12. The method of claim 2, wherein the text encoding subnetwork comprises one or more self-attention neural network layers.

13. The method of claim 2, further comprising, for one or more of the object embeddings:

determining that the region of the image corresponding to the object embedding depicts an object that is included in the category represented by a query embedding based on the classification score distribution for the object embedding.

14. A system comprising:

one or more computers; and one or more storage devices communicatively coupled to the one or more computers, wherein the one or more storage devices store instructions that, when executed by the one or more computers, cause the one or more computers to perform operations comprising:

obtaining: (i) an image, and (ii) a set of one or more query embeddings, wherein each query embedding represents a respective category of object;

processing the image and the set of query embeddings using an object detection neural network to generate object detection data for the image, comprising:

processing the image using an image encoding subnetwork of the object detection neural network to generate a set of object embeddings;

processing each object embedding using a localization subnetwork of the object detection neural network to generate localization data defining a corresponding region of the image; and processing: (i) the set of object embeddings, and (ii) the set of query embeddings, using a classification subnetwork of the object detection neural network to generate, for each object embedding, a respective classification score distribution over the set of query embeddings, wherein the respective classification score distribution for each of the object embeddings defines, for each query embedding, a likelihood that the region of the image corresponding to the object embedding depicts an object that is included in the category represented by the query embedding.

15. One or more non-transitory computer storage media storing instructions that when executed by one or more computers cause the one or more computers to perform operations comprising:

obtaining: (i) an image, and (ii) a set of one or more query embeddings, wherein each query embedding represents a respective category of object;

processing the image and the set of query embeddings using an object detection neural network to generate object detection data for the image, comprising:

processing the image using an image encoding subnetwork of the object detection neural network to generate a set of object embeddings;

processing each object embedding using a localization subnetwork of the object detection neural network to generate localization data defining a corresponding region of the image; and processing: (i) the set of object embeddings, and (ii) the set of query embeddings, using a classification subnetwork of the object detection neural network to generate, for each object embedding, a respective classification score distribution over the set of query embeddings, wherein the respective classification score distribution for each of the object embeddings defines, for each query embedding, a likelihood that the region of the image corresponding to the object embedding depicts an object that is included in the category represented by the query embedding.

16. The method of claim 1, wherein one or more of the query embeddings are each derived from one or more respective query images.

17. The method of claim 16, wherein for one or more of the query embeddings that is derived from one or more query images, obtaining the query embedding comprises:

obtaining the one or more query images, wherein each query image includes a respective target region that depicts an example of a target object;

generating a respective embedding of the target object in each query image; and generating the query embedding by combining the embeddings of the target objects in the query images.

18. The method of claim 17, wherein for each query image, generating the embedding of the target object in the query image comprises:

processing the query image using the image encoding subnetwork to generate a set of object embeddings for the query image;

processing each object embedding for the query image using the localization subnetwork to generate localization data defining a corresponding region of the query image;

determining, for each object embedding for the query image, a respective measure of overlap between: (i) the target region of the query image that depicts the example of the target object, and (ii) the region of the query image corresponding to the object embedding for the query image; and selecting an object embedding from the set of object embeddings for the query image as the embedding of the target object in the query image based on the measures of overlap.

19. The system of claim 14, wherein for one or more of the query embeddings, obtaining the query embedding comprises:

obtaining a text sequence that describes a category of object; and processing the text sequence using a text encoding subnetwork of the object detection neural network to generate the query embedding;

wherein the image encoding subnetwork and the text encoding subnetwork are pre- trained, wherein the pre-training includes repeatedly performing operations comprising:

obtaining: (i) a training image, (ii) a positive text sequence, wherein the positive text sequence characterizes the training image, and (iii) one or more negative text sequences, wherein the negative text sequences do not characterize the training image;

generating an embedding of the training image using the image encoding subnetwork, comprising:

processing the training image using the image encoding subnetwork to generate a set of object embeddings for the training image; and processing the object embeddings using an embedding neural network to generate the embedding of the training image;

generating respective embeddings of the positive text sequence and each of the negative text sequences using the text encoding subnetwork; and jointly training the image encoding subnetwork and the text encoding subnetwork to encourage: (i) greater similarity between the embedding of the training image and the embedding of the positive text sequence, (ii) lesser similarity between the embedding of the training image and the embeddings of the negative text sequences, comprising:

jointly training the image encoding subnetwork and the text encoding subnetwork to optimize an objective function that includes a contrastive loss term.

20. The non-transitory computer storage media of claim 15, wherein for one or more of the query embeddings, obtaining the query embedding comprises:

obtaining a text sequence that describes a category of object; and processing the text sequence using a text encoding subnetwork of the object detection neural network to generate the query embedding;

wherein the image encoding subnetwork and the text encoding subnetwork are pre- trained, wherein the pre-training includes repeatedly performing operations comprising:

obtaining: (i) a training image, (ii) a positive text sequence, wherein the positive text sequence characterizes the training image, and (iii) one or more negative text sequences, wherein the negative text sequences do not characterize the training image;

generating an embedding of the training image using the image encoding subnetwork, comprising:

processing the training image using the image encoding subnetwork to generate a set of object embeddings for the training image; and processing the object embeddings using an embedding neural network to generate the embedding of the training image;

generating respective embeddings of the positive text sequence and each of the negative text sequences using the text encoding subnetwork; and jointly training the image encoding subnetwork and the text encoding subnetwork to encourage: (i) greater similarity between the embedding of the training image and the embedding of the positive text sequence, (ii) lesser similarity between the embedding of the training image and the embeddings of the negative text sequences, comprising:

jointly training the image encoding subnetwork and the text encoding subnetwork to optimize an objective function that includes a contrastive loss term.

* * * * *